Figure 1:
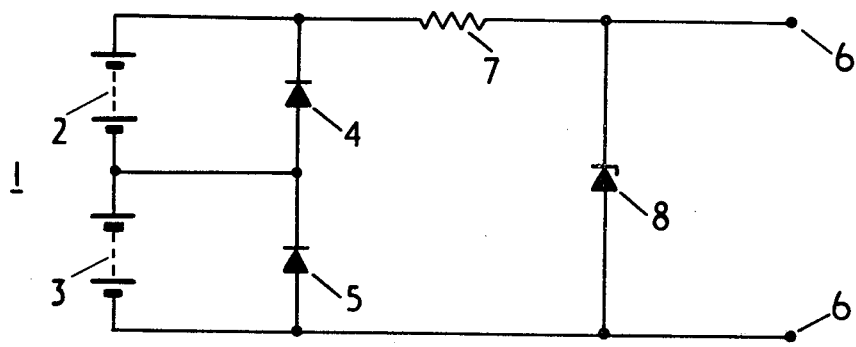

United States Patent
Greenwood

[11] 3,955,132
[45] May 4, 1976

[54] INTRINSICALLY SAFE POWER SUPPLY APPARATUS

[75] Inventor: Alan Norman Greenwood, Burton-on-Trent, England

[73] Assignee: Coal Industry (Patents) Limited, London, England

[22] Filed: June 18, 1974

[21] Appl. No.: 480,511

[30] Foreign Application Priority Data
July 31, 1973 United Kingdom............... 36283/73

[52] U.S. Cl..................................... 323/15; 317/16; 317/18 C; 317/33 R; 320/43; 320/53; 323/8; 323/22 Z
[51] Int. Cl.² ....................... G05F 3/08; H02H 9/00
[58] Field of Search ............ 320/18, 43, 53; 323/15, 323/22 Z, 8; 317/11 R, 11 E, 11 C, 16, 31, 33 R, 78 C

[56] References Cited
UNITED STATES PATENTS

| | | | |
|---|---|---|---|
| 2,624,033 | 12/1952 | Jacquier................................. | 320/18 |
| 3,148,322 | 9/1964 | Booe et al.............................. | 320/43 |
| 3,202,900 | 8/1965 | McGivern, Jr......................... | 320/53 |
| 3,229,185 | 1/1966 | Nye, Jr.................................. | 323/22 Z |
| 3,263,092 | 7/1966 | Knauss .................................. | 323/22 Z |
| 3,813,578 | 5/1974 | Tiffany.................................. | 317/18 C |

FOREIGN PATENTS OR APPLICATIONS

| | | | |
|---|---|---|---|
| 576,461 | 5/1959 | Canada.................................... | 323/8 |
| 977,913 | 12/1964 | United Kingdom............... | 323/22 Z |

OTHER PUBLICATIONS
Instruments and Control Systems, Jan. 1973, p. 99.

Primary Examiner—Gerald Goldberg
Attorney, Agent, or Firm—James C. Wray

[57] ABSTRACT

A battery powered circuit has the battery source divided into serially connected sections and each section is shunted by a diode. The breakdown of one section gives only a low powered spark under fault conditions. The circuit can be used in hazardous environments such as coal mines or petrol installations.

7 Claims, 3 Drawing Figures

INTRINSICALLY SAFE POWER SUPPLY APPARATUS

This invention relates to intrinsically safe power supply apparatus. Intrinsically safe apparatus is defined in British Standard Specification No. 3618 (BS 3618: Section 7: 1973, page 5) as "Apparatus that is so constructed that, when installed and operated under the conditions specified by the certifying authority, any electrical sparking that may occur in normal working, either in the apparatus or in the circuit associated therewith, is incapable of causing an ignition of the prescribed flammable gas or vapor."

In many applications of power supply apparatus it is necessary to use intrinsically safe apparatus to avoid any risk of explosion. One particular example of such an application is in coal mines where fire damp exists and where any spark could cause explosion of the fire damp with disastrous consequences. Another application is in chemical refining plants where volatile vapors having a low flashpoint are given off.

In order to produce an intrinsically safe power supply it has previously been proposed to insert a current limiting resistor between the basic electrical source of energy which may be mains or a battery and the output terminals. The use of a current limiting resistor in series with the source has the disadvantage that as the voltage of the source is increased the current limiting resistor value has to be increased by a large amount to maintain the intrinsically safe output condition so that beyond a certain voltage the power available is progressively reduced. If the source is a battery it will be appreciated that the voltage lost across the resistor leads to an early discharging of the battery.

It is necessary that the value of the current limiting resistor should be chosen when the voltage at the source is at its highest and therefore a high percentage loss of voltage must occur as a discharge condition of the battery is approached.

In order to overcome the disadvantages encountered by using a current limiting resistor it has been proposed to use a zener diode to shunt the current limiting resistor and the power source. This gives some increase of power output since the zener diode limits the voltage on the external circuit and thus the value of the current limiting resistor can be reduced from the value which would be necessary if no diode was present. A further improvement has been obtained by dividing the current limiting resistor into two serially connected parts and shunting the zener diode across the source and one of these parts only.

If a mains supply is being used then the equipment must be enclosed in a flameproof box and this means that only the output terminals need to be intrinsically safe. The use of a flameproof box is not practical for portable equipment and it is usually necessary to include a battery as the voltage source and the intrinsically safe aspects of the circuit must be carried right back to the battery terminals.

It is an object of the present invention to provide intrinsically safe power supply apparatus which is able to be portable and which is intrinsically safe particularly at the battery connections where sparking may occur especially under conditions of vibration and during battery replacement.

According to the invention intrinsically safe power supply apparatus supplied from a battery source and incorporating a current limiting resistor has the battery divided into at least two serially connected sections and each section is shunted by an individual uni-directional conducting element.

The uni-directional conducting element is preferably a diode and each section of the battery is of approximately equal value in a preferred embodiment. A plurality of sections in excess of two each shunted by its individual element may be used. The shunt will be in the same direction of conduction for each section. Preferably the apparatus incorporates voltage regulator means.

The current limiting resistor is preferably connected to the battery on the output side of its junction with the shunting uni-directional conducting elements.

The current limiting resistor may be divided into two, preferably equal value, sections, the sections being connected to the battery, one at each end, on the output side of its junction with the uni-directional conducting element. Alternatively it is possible to divide th current limiting resistor into a number of sections and to connect one section of the resistor adjacent and in series with each section of the battery.

The voltage regulating means may comprise a zener diode. Alternatively, the voltage regulating means may comprise a voltage regulating circuit.

In a modification of the invention a zener diode may be shunted across the voltage regulating circuit.

In order that the invention may be readily understood, three examples of intrinsically safe power supply apparatus incorporating the invention will now be described with reference to FIGS. 1, 2 and 3 of the accompanying drawings. These figures show schematic circuit diagrams of the apparatus and like parts in each figure have been given the same reference.

Referring first to FIG. 1 the apparatus comprises a battery 1 which is divided into two equal sections 2, 3. The section 2 is shunted by a solid state diode 4 and the section 3 is shunted by a solid state diode 5. The top of the battery 1 is fed to output terminals 6 through a current limiting resistor 7. A zener diode 8 is connected across terminals 6 and effectively shunts the battery 1.

This circuit provides a considerable increase in power output capability over previously available circuits since it enables a whole circuit to be intrinsically safe. The value of the resistor 7 is chosen initially so that the output terminals 6 are intrinsically safe and it will be appreciated that if a short circuit occurs at any point in the circuit then due to the action of the diodes 4 or 5 if the circuit is then subjected to a break at the battery any sparking will be effectively quenched or will be at such a low level as not to cause a hazard. Thus if the section 2 is broken the current from section 3 will be passed through the diode 4. Section 2 is thus effectively shunted from the voltage of section 3 and the energy in section 3 is not available for spark energy at the gap in section 2.

It will be appreciated that the battery 1 may be subdivided down into as many sections as there are cells and the number of diodes may be increased so that each cell is shunted by its own diode.

Figure 2:
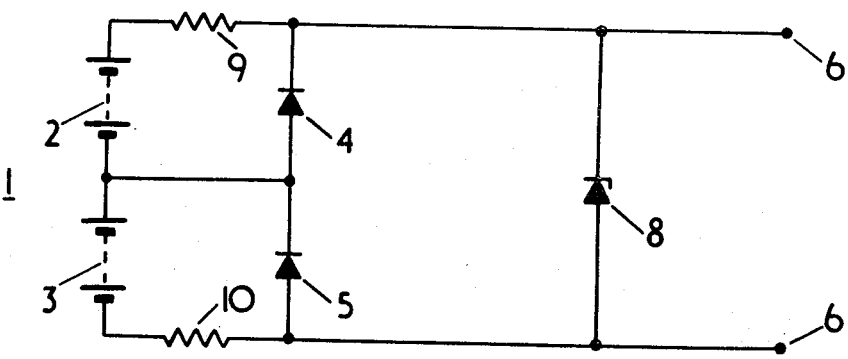

FIG. 2 shows a modification of the circuit of FIG. 1 where the resistor 7 of FIG. 1 has been divided into two parts 9 and 10 connected respectively to the output ends of sections 2 and 3. This arrangement gives a more balanced circuit than that of FIG. 1. The resistors 9 and 10 alternatively may be repositioned to be between the zener diode 8 and diodes 4, 5.

Figure 3:
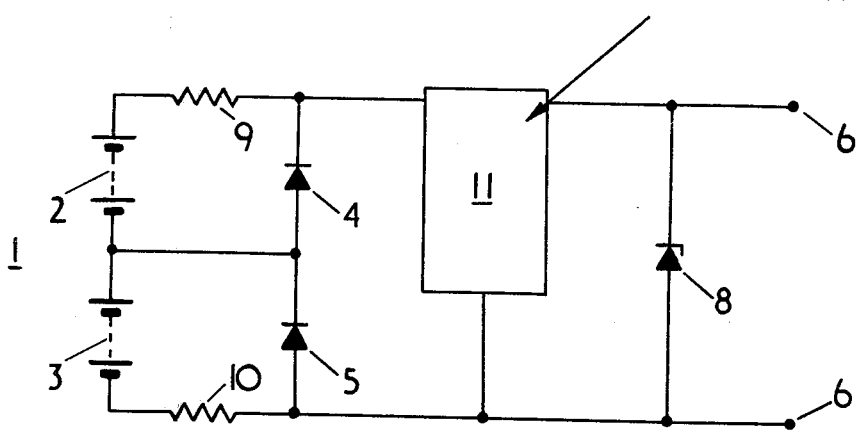

In order to reduce the quiescent current through the zener diode a voltage regulator 11 may be added to the circuit of FIG. 2 as is shown in FIG. 3. This regulator would maintain the voltage just below the conducting voltage of the zener diode 8. The zener diode then becomes effective only when the regulator 11 fails. It may, of course, be possible to incorporate the zener diode 8 into the circuit of the regulator 11.

I claim:

1. Intrinsically safe portable power supply apparatus comprising a battery source, output terminals connected to the source, a zener diode connected across the source and the output terminals, a current limiting resistor means connected to the source and to the zener diode, in which the battery source is divided into a plurality of sections and including an equal plurality of unidirectional conducting elements, a separate one of said elements being connected across each section of the battery source, the current limiting resistor means comprising a current limiting resistor connected between an end section of the battery source and a unidirectional conducting element, whereby the apparatus is rendered intrinsically safe, whereby upon a break at a first section of the battery, current from a remaining section flows around the first section through a unidirectional conducting element connected across the first section, avoiding high energy level sparking at the break, and whereby upon a break in an end section of the battery adjacent the current limiting resistor, that end section and the current limiting resistor are bypassed by the unidirectional element.

2. The intrinsically safe power supply apparatus in accordance with claim 1, in which the unidirectional conducting elements are diodes.

3. The intrinsically safe power supply apparatus in accordance with claim 1 and incorporating two current limiting resistor sections, one section being connected to one end of the battery source and the other section being connected to the other end of the battery source.

4. The intrinsically safe power supply apparatus according to claim 3, in which each current limiting resistor section is connected to the junction of the battery section and its respective uni-directional conducting element.

5. The intrinsically safe power supply apparatus according to claim 3, in which the current limiting resistor section is connected in series between the battery section and its respective uni-directional conducting element.

6. The intrinsically safe power supply apparatus as claimed in claim 1 and including voltage regulating means connected across the said output terminals.

7. The intrinsically safe power supply apparatus as claimed in claim 6 in which the voltage regulating means is a voltage regulator circuit connected across the output terminals.

* * * * *